(12) United States Patent
Noguchi

(10) Patent No.: US 6,885,394 B1
(45) Date of Patent: Apr. 26, 2005

(54) METHOD AND APPARATUS FOR OUTPUTTING MULTI-BAND IMAGE

(75) Inventor: Takafumi Noguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/573,843

(22) Filed: May 19, 2000

(30) Foreign Application Priority Data

May 19, 1999 (JP) .......... 11-138643

(51) Int. Cl.$^7$ .......... H04N 5/228
(52) U.S. Cl. .......... 348/223.1; 348/223.1; 348/227.1; 348/228.1; 348/33
(58) Field of Search .......... 348/33, 223.1, 348/227.1, 25, 29, 34, 228.1, 260, 263, 266, 272, 370, 557, 655; 382/191, 162; 358/515

(56) References Cited

U.S. PATENT DOCUMENTS

| | | | | |
|---|---|---|---|---|
| 5,864,364 A | * | 1/1999 | Ohyama et al. | 348/211.14 |
| 6,466,334 B1 | * | 10/2002 | Komiya et al. | 358/1.9 |
| 2004/0037589 A1 | * | 2/2004 | Yamauchi et al. | 399/130 |

FOREIGN PATENT DOCUMENTS

JP 11-85952 A 3/1999

OTHER PUBLICATIONS

Miyakawa et al. "A Total Simulation System for Color Photographic Images" Optics, vol. 11, No. 6, pp 573–577, 1982.

Ohta et al., "Image Simulation Using Laser Color Printer", O plus E, pp 57–64, 1981.

R.W.G. Hunt, "The Reproduction of Color", Fountain Press, $4^{th}$ edition, pp 177–197, 1987.

Noboru Ohta, "Color Reproduction in Color Photography", Psychological Review, vol. 28, No. 1, pp 147–167, 1985.

Stephen K. Park et al., "Estimation of spectral reflectance curves from multispectral image data", Applied Optics, vol. 16, No. 12, pp 3107, 1977.

* cited by examiner

Primary Examiner—Wendy R. Garber
Assistant Examiner—Nelson D. Hernandez
(74) Attorney, Agent, or Firm—Sughrue Mion, PLLC

(57) ABSTRACT

There is provided a method outputting multi-band image data, including the steps of obtaining a spectral waveform per pixel of an image photographed by a multi-band camera; performing conversion of the thus obtained spectral waveform per pixel into control signals corresponding to a plurality of image reproduction processes, for outputting to an image outputting machine; and obtaining a final control signal synthesizing the plurality of control signals. There is also provided an apparatus for implementing the above method. The image reproduction processes can be consecutively switched in accordance with the purpose of the image reproduction, whereupon the image can be outputted in the image reproduction process suited most to the purpose for reproducing the color with a higher priority given to which factor, the coincidence of the visual appearance between the original image and the duplicate image or the stability of visual appearance.

30 Claims, 4 Drawing Sheets

METHOD AND APPARATUS FOR
OUTPUTTING MULTI-BAND IMAGE

BACKGROUND OF THE INVENTION

The present invention relates to a method and an apparatus for outputting a multi-band image.

With progresses of photographing technologies over the recent years, a multi-channel photographing machine (a multi-band camera), particularly a photographing machine having channels of which the number is plural enough to restore spectral waveforms of a photographing object at an accuracy sufficient for practical use. This multi-band camera may be categorized as a camera capable of obtaining plural pieces of image data (multi-band image data) by photographing the same object with light beams in a plurality of different wavelength bands (multi-bands) light transmitting (over four kinds of light beams in the great majority of cases). This type of camera is disclosed on pp. 573~578 in "Optics" 11(6) (1982), Miyagawa et al.

The data of the multi-band image photographed by this multi-band camera has a spectral waveform per pixel, and hence a variety of applications are expected.

Further, there are known a variety of methods of outputting the multi-band image data, and typical methods thereof are a method of reproducing a chromaticity of the object (which will hereinafter be called a chromaticity reproduction process) and a method of reproducing a spectral waveform of the object (which will hereinafter be termed a waveform reproduction process).

The prior art documents that propose methods of outputting the multi-band image data include Unexamined Published Japanese Patent Application No. 11-85952 for the chromaticity reproduction process and "Image Simulation Using Laser Color Printer", Ohta et al., O plus E, pp. 57–64, (September 1981) for the waveform reproduction process.

There arise, however, the following problems inherent in the chromaticity reproduction process and the waveform reproduction process.

That is, the chromaticity reproduction process gives a high degree of the coincidence of the visual appearance between the original image and the duplicate image when reproducing the color under a limited light source, but has a problem in which the degree of the coincidence of the visual appearance largely declines if observing conditions such as an observation light source change.

By contrast, the waveform reproduction process gives a stable degree of the coincidence of the visual appearance which does not depend upon the observing conditions such as the observation light source, but has such a problem that the degree of the coincidence under then limited observing conditions is inferior to that of the chromaticity reproduction process.

SUMMARY OF THE INVENTION

It is a primary object of the present invention, which was devised to obviate the problems inherent in the prior art, to provide a method and an apparatus for outputting a multi-band image, which are capable of outputting the image in an image reproduction process suited most to a purpose for reproducing a color with a higher priority given to which factor, a degree of the coincidence of the visual appearance between an original image and a duplicate image or a stability of visual appearance by consecutively switching image reproduction processes when outputting multi-band image data.

In order to attain the above object, according to a first aspect of the present invention, there is provided a method for outputting multi-band image data, comprising the steps of: obtaining a spectral waveform per pixel of an image photographed by a multi-band camera; performing conversion of the thus obtained spectral waveform per pixel into a control signal corresponding to each of a plurality of image reproduction processes, for outputting to an image outputting machine; and synthesizing a plurality of control signals corresponding to the plurality of image reproduction processes, respectively, to obtain a final control signal.

In the multi-band image data outputting method described above, it is preferable that the plurality of image reproduction processes include a chromaticity reproduction and a waveform reproduction of the spectral waveform per pixel.

It is further preferable that the conversion performing step comprises the steps of determining a spectral waveform of a reproduced image of the photographed image from the spectral waveform of the photographed image and converting the thus determined spectral waveform of the reproduced image to the control signal for outputting to the image outputting machine.

It is still further preferable that the plurality of image reproduction processes include a chromaticity reproduction and a waveform reproduction of the spectral waveform per pixel, and when the spectral waveform of the photographed image is denoted by $f_0(\lambda)$, the spectral waveform of the reproduced image of the photographed image is denoted by $f(\lambda)$ and color matching functions are denoted by $\bar{x}(\lambda)$, $\bar{y}(\lambda)$ and $\bar{z}(\lambda)$, the chromaticity reproduction comprises the step of determining the spectral waveform $f(\lambda)$ of the reproduced image in such a way that a distance $\|f_0-f\|$ defined by a following formula (3) is minimized; and the waveform reproduction comprises the step of determining the spectral waveform $f(\lambda)$ of the reproduced image in such a way that a distance $\|f_0-f\|$ defined by a following formula (4), (5) or (6) is minimized, $$\|f_0 - f\| = \{|(f_0, \bar{x}) - (f, \bar{x})|^2 + \qquad (3)$$
$$|(f_0, \bar{y}) - (f, \bar{y})|^2 + |(f_0, \bar{z}) - (f, \bar{z})|^2\}^{1/2}$$

$$\|f_0 - f\| = \sqrt{\int |f_0(\lambda) - f(\lambda)|^2 d\lambda} \qquad (4)$$

$$\|f_0 - f\| = \int |f_0(\lambda) - f(\lambda)| d\lambda \qquad (5)$$

$$\|f_0 - f\| = sup\{|f_0(\lambda) - f(\lambda)|\} \qquad (6)$$

wherein a symbol $(A, B)$ in the above formula (3) represents an inner product of functions $A(\lambda)$, $B(\lambda)$ of wavelength $\lambda$ and is defined by a following formula (2), a symbol $\int$ in the above formulae (4) and (5) represent integration over all the wavelength $\lambda$ and a symbol sup in the above formula (6) represents an upper limit.

$$(A, B) = \int A(\lambda)B(\lambda)d\lambda \qquad (2)$$

It is also preferable that the multi-band image data outputting method further comprises the step of setting a priority for the plurality of image reproduction processes; wherein the plurality of control signals are synthesized based on the priority.

In the multi-band image data outputting method, it is another preferable that the priority is set interactively.

It is further preferable that the conversion is performed with a look-up table showing relations between the control signal for outputting to the image outputting machine and the spectral waveform.

It is still further preferable that the spectral waveform is a, spectral reflectance.

It is preferable that the control signal is an input signal of a type and a channel number determined in accordance with an image outputting mode of the image outputting machine.

It is also preferable that the control signal is a density signal.

It is another preferable that the image outputting machine is a laser printer and the control signal are a density signal of each of three primary colors of red, green and blue.

It is further preferable that the image outputting machine is a printing press or a printer for a printing and the control signal is a density signal of each of four colors of yellow, magenta, cyan and black.

It is still further preferable that the image outputting machine is a cathode ray tube type display device and the control signal is an applied voltage of an electron gun of the cathode ray tube type display device.

According to a second aspect of the present invention, there is provided an apparatus for outputting multi-band image data, comprising: a data input unit for inputting multi-band image data obtained from an image photographed by a multi-band camera; a control signal converting unit for converting a spectral waveform per pixel into a control signal, corresponding to each of a plurality of image reproduction processes, for outputting the image to an image outputting machine; and a control signal synthesizing unit for obtaining a final control signal by synthesizing a plurality of control signals into which the control signal converting unit has converted spectral waveforms.

In the multi-band image data outputting apparatus described above, it is preferable that the plurality of image reproduction processes include a chromaticity reproduction and a waveform reproduction of the spectral waveform per pixel.

It is also preferable that the multi-band image data outputting apparatus further includes a priority setting unit for setting a priority for the plurality of image reproduction processes; wherein the control signal synthesizing unit synthesizes the plurality of control signals converted by the control signal converting unit based on the priority, thereby obtaining the final control signal.

It is another preferable that the priority setting unit sets the priority interactively.

It is further preferable that the control signal converting unit converts the spectral waveform into the control signal with a look-up table showing relations between the control signal for outputting to the image outputting machine and the spectral waveform.

It is still further preferable that the spectral waveform is a spectral reflectance.

It is preferable that the control signal is an input signal of a type and a channel number determined in accordance with an image outputting mode of the image outputting machine.

It is also preferable that the control signal is a density signal.

It is still another preferable that the image outputting machine is a laser printer and the control signal is a density signals of each three primary colors of red, green and blue.

It is further preferable that the image outputting machine is a printing press or a printer for a printing and the control signal is a density signal of each of four colors of yellow, magenta, cyan and black.

It is still further preferable that the image outputting machine is a cathode ray tube type display device and the control signal is an applied voltage of an electron gun of the cathode ray tube type display device.

It is further preferable that the control signal converting unit determines a spectral waveform of a reproduced image of the photographed image from the spectral waveform of the photographed image and converts the thus determined spectral waveform of the reproduced image to the control signal for outputting to the image outputting machine.

It is still further preferable that the plurality of image reproduction processes include a chromaticity reproduction and a waveform reproduction of the spectral waveform per pixel, and when the spectral waveform of the photographed image is denoted by $f_0(\lambda)$ the spectral waveform of the reproduced image of the photographed image is denoted by $f(\lambda)$ and color matching functions are denoted by $\bar{x}(\lambda)$, $\bar{y}(\lambda)$ and $\bar{z}(\lambda)$, the chromaticity reproduction comprises the step of determining the spectral waveform $f(\lambda)$ of the reproduced image in such a way that a distance $\|f_0-f\|$ defined by a following formula (3) is minimized; and the waveform reproduction comprises the step of determining the spectral waveform $f(\lambda)$ of the reproduced image in such a way that a distance $\|f_0-f\|$ defined by a following formula (4), (5) or (6) is minimized, $$\|f_0 - f\| = \{|(f_0, \bar{x})(f, \bar{x})|^2 + |(f_0, \bar{y})(f, \bar{y})|^2 + |(f_0, \bar{z})(f, \bar{z})|^2\}^{1/2} \quad (3)$$

$$\|f_0 - f\| = \sqrt{\int |f_0(\lambda) - f(\lambda)|^2 d\lambda} \quad (4)$$

$$\|f_0 - f\| = \int |f_0(\lambda) - f(\lambda)| d\lambda \quad (5)$$

$$\|f_0 - f\| = sup\{|f_0(\lambda) - f(\lambda)|\} \quad (6)$$

wherein a symbol (A, B) in the above formula (3) represents an inner product of functions $A(\lambda)$, $B(\lambda)$ of wavelength $\lambda$ and is defined by a following formula (2), a symbol $\int$ in the above formulae (4) and (5) represent integration over all the wavelength $\lambda$ and a symbol sup in the above formula (6) represents an upper limit.

$$(A, B)=\int A(\lambda)B(\lambda)d\lambda \quad (2)$$

DETAILED DESCRIPTION OF THE INVENTION

A method and an apparatus for outputting a multi-band image according to the present invention will hereinafter be described in details based on preferred embodiments with reference to the accompanying drawings.

Figure 1:
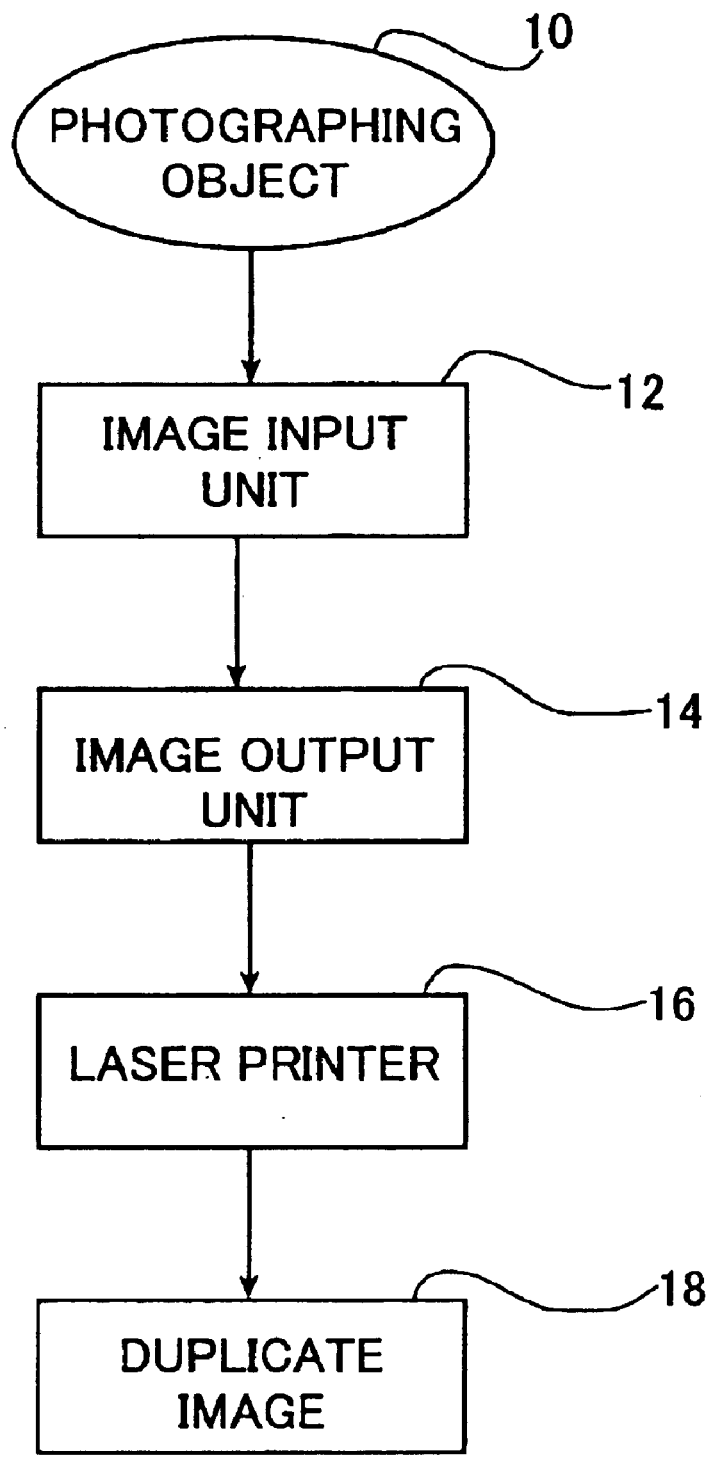
FIG. 1 is a block diagram showing a scheme of an embodiment of an image reproducing system incorporating a multi-band image outputting apparatus of the present invention.

FIG. 1 is a block diagram showing a schematic outline of an embodiment of an image reproducing system incorporating a multi-band image outputting apparatus of the present invention.

As shown in FIG. 1, the present image reproducing system is constructed such that an image input unit 12 takes in a photographing object (object) 10 as multi-band image data and estimates a spectral waveform of the photographing object 10, and an image output unit (an image outputting device) 14 converts this spectral waveform into a control signal for outputting an image corresponding to a purpose, and, based on this control signal, a duplicate image 18 is outputted from a laser printer 16.

When outputting the multi-band image data, if the coincidence of the visual appearance between the original image and the: duplicate image can be given under the limited observing conditions, a chromaticity reproduction is suited. By contrast, if there is obtained a stability of the visual appearance in the original image and the duplicate image under a plurality of observing conditions such as causing no large change in a visual aspect even when the observing conditions vary, the waveform reproduction is suited.

The documents that mention the chromaticity reproduction such as the calorimetric color reproduction and the waveform reproduction such as the spectral color reproduction include "The Reproduction of Color", R.W.G. Hunt, 4th edition, pp. 177~197, Fountain Press, (1987), and "Color Reproduction in Color Photography", Noboru Ohta, Psychological Review, 28(1), pp. 147~167, (1985).

Those methods of outputting the multi-band image will hereinafter be explained, however, for simplifying the discussion, it is assumed that the object is photographed by the multi-band camera, and the image is outputted from a color printer. Then, let $f_0(\lambda)$ be the spectral reflectance, $f(\lambda)$ be the spectral reflectance of a print, and $\bar{x}(\lambda)$, $\bar{y}(\lambda)$, $\bar{z}(\lambda)$ be the color matching functions.

To start with, according to the chromaticity reproduction process, an emphasis is put on coincidence of a visual appearance of an original image with a duplicate image as viewed through a human eye, and $f(\lambda)$ satisfying the following formula (1) is selected.

$(f_0, \bar{x}) = (f, \bar{x})$ $(f_0, \bar{y}) = (f, \bar{y})$ $(f_0, \bar{z}) = (f, \bar{z})$ (1)

Note that the symbol (A, B) herein represents an inner product of functions $A(\lambda)$, $B(\lambda)$ of $\lambda$ and is defined by the following formula (2).

$(A, B) = \int A(\lambda) B(\lambda) d(\lambda)$ (2)

$f(\lambda)$ for establishing the formula (1) given above is selected by some method. As a matter of fact, however, there does not necessarily exist $f(\lambda)$ satisfying the formula (1) in a strict sense in terms of a constraint of a color reproducing region (color gamut) of the output machine (printer). Such being the case, a distance $\|f_0-f\|$ between $f_0(\lambda)$ and $f(\lambda)$ is defined by the following formula (3), and the spectral waveform (waveform of the spectral reflectance) $f(\lambda)$ for minimizing this distance may be selected and outputted.

$$\|f_0 - f\| = \{|(f_0, \bar{x}) - (f, \bar{x})|^2 + |(f_0, \bar{y}) - (f, \bar{y})|^2 + |(f_0, \bar{z}) - (f, \bar{z})|^2\}^{1/2}$$ (3)

As a matter of course, when the formula (1) is established, the distance expressed in the above formula (3) becomes o. If not 0, however, the scheme is to select $f(\lambda)$ that is approximate to 0 to the greatest possible degree, i.e., closest to $f_0(\lambda)$.

While on the other hand, according to the waveform reproduction process, for making the spectral waveforms coincident, the distance $\|f_0-f\|$ is given by the following formula (4) for carrying out integration of all the wavelengths with respect to the difference between $f_0$ and $f$ instead of the above formula (3), and $f(\lambda)$ minimizing this distance is chosen and outputted.

$$\|f_0 - f\| = \sqrt{\int |f_0(\lambda) - f(\lambda)|^2 d\lambda}$$ (4)

Alternatively, other than this method, as shown in the following formula (5), the obtainment of the distance $\|f_0-f\|$ may simply involve the use of integration of an absolute value of the difference, or the use of an upper limit (sup) of the absolute value of the difference as shown in the formula (6).

$$\|f_0 - f\| = \int |f_0(\lambda) - f(\lambda)| d\lambda$$ (5)

$$\|f_0 - f\| = \sup\{|f_0(\lambda) - f(\lambda)|\}$$ (6)

In the formula (6), however, the upper limit sup should be taken with respect to all the wavelength ($\lambda$) Furthermore, the actual calculation deals with only a discrete value, and therefore the upper limit sup may be maximum.

In accordance with this embodiment, corresponding to the purpose or intended use of image reproduction to give a priority to either the coincidence of the visual appearance or the stability of the visual appearance, the image suited to this purpose or intended use is outputted by switching the image reproduction process.

A hard copy image or soft copy image in which priority is given to the coincidence of the visual appearance is suitable for applications in which control of observation light sources can be expected, for example for preparing proof print. On the other hand, a hard copy image or soft copy image in which priority is given to the stability of the visual appearance is suitable for applications for amateurs in which control of the observation light sources cannot be expected.

In the present embodiment, the image input unit 12 converts a plurality of multi-band images photographed by multi-band photography with a multi-band camera into digital image data, and transmits the image data to the image output unit 14. According to the present image reproducing system, a spectral reflectance of the entire surface of the photographing object 10 can be measured for each pixel by use of the multi-band image.

Figure 2:
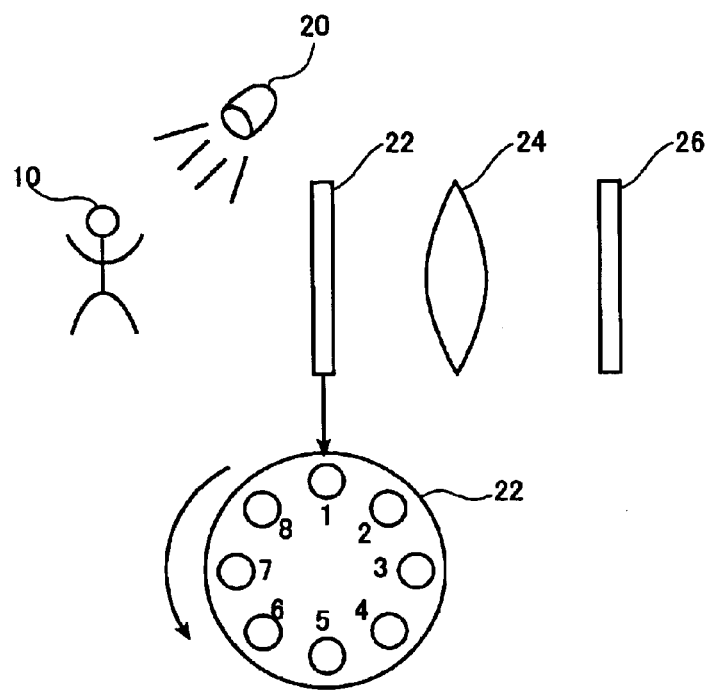
FIG. 2 is an explanatory view showing a principle of multi-band photography.
Figure 3:
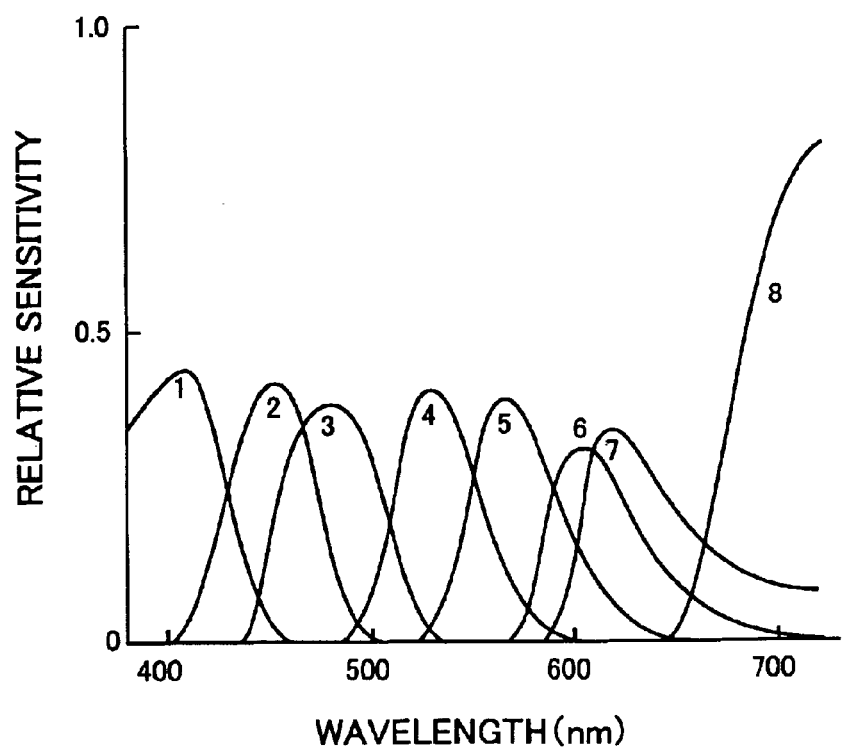
FIG. 3 is a graph showing a relative sensitivity per channel which is obtained by the multi-band photography.

Referring to FIG. 3, we now describe the principle of the multi-band photography for an exemplary case where, e.g., a person is photographed in a studio as shown in FIG. 2. FIGS. 2 and 3 show the construction of a device for measuring spectral reflectance and spectral transmittance of a 8-channel filter, respectively, which are disclosed in Miyagawa et al., "Optics", 11(6), pp. 573~578, (1982).

As shown in FIG. 2, using a filter plate 22 having eight filters; different in the transmission wavelength band, the photographing object (object) 10 is illuminated with light beams from a specified light source 20 and the reflected light from the photographing object 10 is made to pass through a filter of the filter plate 22, after which an image is focused through a lens 24 on a monochromic film 26 having a substantially uniform spectral sensitivity over a visible wavelength region, thus photographing an image. Thereafter, the filter plate 22 is rotated to change over the eight filters from one to another to photograph successively in total eight images from the same photographing: object 10. The thus obtained eight images have color information of the photographing object 10 that has been obtained via a plurality of channels (in this case eight channels) exhibiting different spectral sensitivities. The eight images are read for each pixel with an input device (e.g., scanner) and the thus read images are converted for each pixel into digital data, which is used to restore the spectral reflectance of the photographing object 10. FIG. 3 shows the spectral transmittances of individual eight wavelength bands that the eight filters of the filter plate 22 have, namely relative sensitivity obtained for each channel.

The spectral reflectance fo($\lambda$) of the photographing object 10 can be estimated from the thus read digital data by using an interpolation technique. The interpolation technique is not limited in any particular way, and well known common interpolation methods can be used which include for example an interpolation method disclosed in S. K. Park and F. O. Huck: Appl. Opt., 16 (1977) 3107.

The spectral reflectance on the entire surface of the photographing object 10 can be measured for each pixel by estimating the spectral reflectance from the digital data of each pixel that has been read from a plurality of multi-band images.

Further, there can be given a photographing method which uses e.g., a photographing lens, a CCD sensor for photoelectrically reading the focused light by the photographing lens and a plurality of, at least four pieces of band-bass filters constructed of color filters disposed anterior to the photographing lens, and which photographs the same object while sequentially exchanging these band-pass filters when in photographing.

There can be also given a photographing method which uses the photographing lens and at least four types of CCD sensors capable of photoelectrically reading the focused images in four wavelength regions having different spectral sensitivity characteristics, without the band-pass filters. In this case, the CCD sensor may incorporate the band-pass filter. Moreover, a liquid crystal tunable filter may be used as the band-pass filter.

In that case, the spectral reflectance of the photographing object can be restored at a higher accuracy as the number of channels becomes larger. When considering a simplicity of the device and a reduction in photographing time, however, 6 through 20 channels may be preferable. A computer-assisted simulation as disclosed in Miyagawa et al., "Optics", 11(6), pp. 573~578, (1982) proves that a degree of improvement based on an increase in the number of channels is saturated up to approximately 8 channels, and hence about 8 channels are preferably adapted when a common image is to be photographed, and 8 channels or thereabouts are sufficient.

Figure 4:
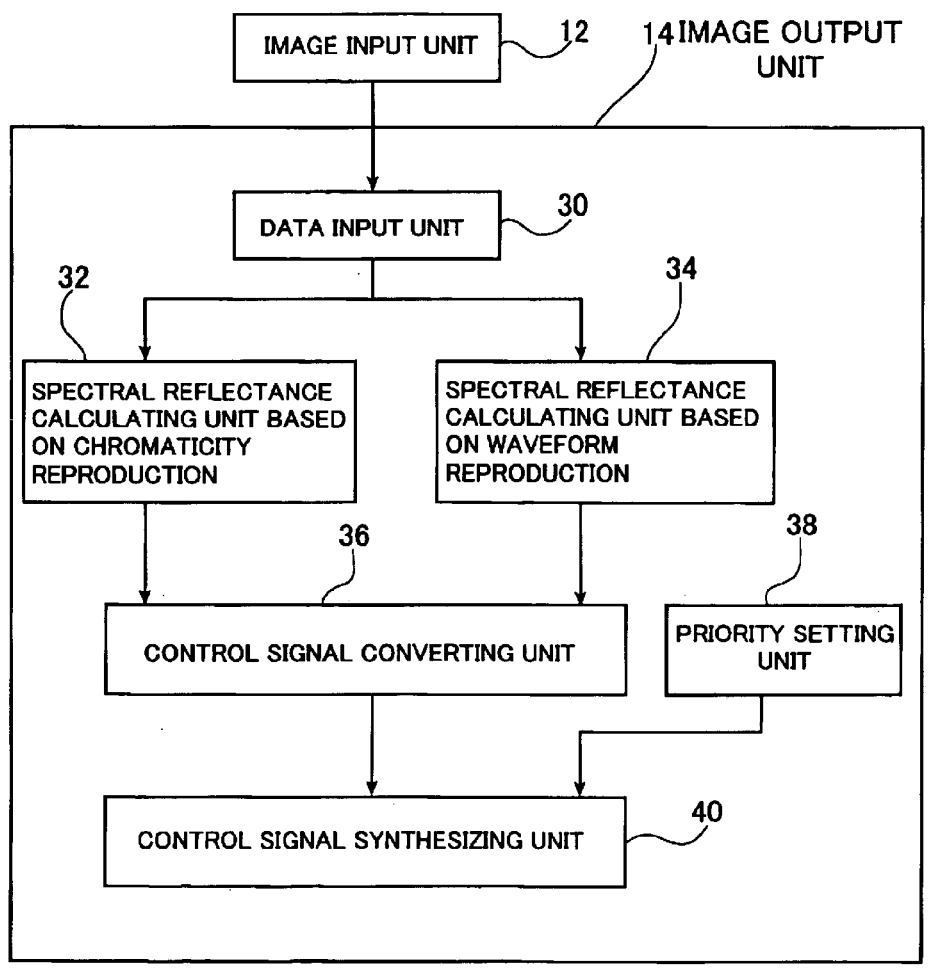
FIG. 4 is a block diagram showing a scheme of an image outputting apparatus in an embodiment of the present invention.

The multi-band image data with the spectral waveform estimated per pixel is converted into the control signal for outputting the image corresponding to the purpose by the image output unit 14. FIG. 4 schematically shows a construction of an embodiment of the image output unit 14. As shown in FIG. 4, the image output unit 14 includes a data input unit 30 for receiving data of the spectral waveform (spectral reflectance) per pixel which has been estimated from the image input unit 12, a spectral reflectance calculating unit 32 for obtaining such a waveform as to obtain a degree of a coincidence of the visual appearance from the spectral waveform data (spectral reflectance) on the basis of the chromaticity reproduction, a spectral reflectance calculating unit 34 for obtaining such a waveform as to obtain a stability of the visual appearance on the basis of the waveform reproduction, and a control signal converting unit 36 for converting each of the waveforms into a control signal for outputting each image. The image output unit 14 further includes a priority setting unit 38 for giving a priority to which reproduction, the chromaticity reproduction or the waveform reproduction corresponding to the purpose, and a control signal synthesizing unit 40 for creating one final single control signal for outputting the image by synthesizing the respective control signals obtained by the converting unit 36 in accordance with the priority.

The spectral reflectance calculating unit 32 based on the chromaticity reproduction calculates a spectral reflectance f($\lambda$) of a print where the degree of the coincidence of the visual appearance is obtained, from the spectral reflectance fo($\lambda$) of the photographing object 10. The reflectance is obtained as a waveform f($\lambda$) minimizing the distance given by the formula (3).

On the other hand, the spectral reflectance calculating unit 34 based on the waveform reproduction calculates a spectral reflectance f($\lambda$) of a print where the stability of the visual appearance is obtained, from the spectral reflectance $f_0(\lambda)$ of the photographing object 10. This reflectance is obtained as a waveform f($\lambda$) minimizing the distance given by the formula (4). As a matter of course, the formula (5) or (6) may also be used in place of the formula (4) in the case of the waveform reproduction.

Next, the control signal converting unit 36 converts the thus obtained spectral reflectances $f_0(\lambda)$ respectively into control signals in accordance with a look-up table (LUT) showing relations between the spectral reflectances $f_0(\lambda)$ and the control signals (R, G, B) when the laser printer 16 exposes the images to the laser beams of R, G, B with which a sheet of photographic paper is irradiated.

This look-up table LUT may be given to the system beforehand or created by the system. In the case of creating the table LUT, for example, a plurality of patches are outputted from the laser printer 16 and read by a spectral calorimeter and so on, and there may be gained relations between the measured spectral reflectances and the control signals when the laser printer outputs the patches.

Let $R_0$, $G_0$, $B_0$ be the control signals in the case of converting the spectral reflectances obtained based on the chromaticity reproduction, and $R_1$, $G_1$, $B_1$ be the control signals in the case of converting the spectral reflectances obtained based on the waveform reproduction.

Further, there might be a case where the coincidence of the visual appearance is emphasized and the stability of the visual appearance is needed depending on applications, etc. of the images, and the priority setting unit 38 sets a priority k indicating which factor, the coincidence of the visual appearance or the stability of the visual appearance, is to be given a higher priority depending on the respective purposes.

Then, the control signal synthesizing unit 40 obtains final control: signals ($R_k$, $G_k$, $B_k$) for outputting the single image by synthesizing the two sets of obtained control signals ($R_0$, $G_0$, $B_0$) and ($R_1$, $G_1$, $B_1$) by use of the priority k. This synthesization is attained in the following formula (7).

$$\begin{pmatrix} R_k \\ G_k \\ B_k \end{pmatrix} = (1-k) \cdot \begin{pmatrix} R_0 \\ G_0 \\ B_0 \end{pmatrix} + k \cdot \begin{pmatrix} R_1 \\ G_1 \\ B_1 \end{pmatrix} \qquad (7)$$

If the final control signal is given in the formula (7), the priority k may take an arbitrary value of real number, however, a preferable range is $0 \leq k \leq 1$.

Thus, when the degree of the coincidence of the visual appearance is obtained by introducing the priority k, the chromaticity reproduction ($R_0$, $G_0$, $B_0$) is acquired when k is set to 0. In the case of obtaining the stability of the visual appearance, the waveform reproduction ($R_1$, $G_1$, $B_1$) is obtained when k is set to 1. An intermediate reproduction can be also gained by substituting other value into k.

The following Table 1 is a brief expression of what has been described as above.

TABLE 1

| Purpose | Degree of the Coincidence of the Visual Appearance | | The Stability of the Visual Appearance |
| --- | --- | --- | --- |
| Reproduction Process Control Signals | Chromaticity Reproduction ($R_0$, $G_0$, $B_0$) | ... | Waveform Reproduction ($R_1$, $G_1$, $B_1$) |

In this Table, " . . . " represents the intermediate reproduction.

The laser printer 16 outputs the image where the color reproduction suited to the purpose has been thus performed. At that time, a variety of image processes corresponding to the necessities are executed, however, an explanation thereof is omitted herein.

Note that the priority setting unit 38 is in fact a keyboard, etc. connected to a personal computer constituting the image outputting device serving as a principal unit of the present image reproducing system, and an operator inputs the priority k through this setting unit 38. Then, it is preferable that the processing proceeds to obtain a desired image in such an interactive manner that the output image after the conversion is displayed on a display unit, etc. of the personal computer, and the operator resets the priority k while watching the image and so forth.

It is to be noted that a difference between the chromaticity reproduction and the waveform reproduction in the image output machine (printer) is nothing but a difference in definition of the distance $\|f_0 - f\|$ representing a proximity between the spectral waveform $f_0(\lambda)$ of the photographing object and the spectral waveform $f(\lambda)$ of the print (which is a difference in terms of using the formula (3) (the chromaticity reproduction) or the formula (4) (the waveform reproduction). Accordingly, for instance, there may be used the formula (5) or (6) or other definition of the distance excluding the formulae (3) and (4) and obtained control signals (Ri, Gi, Bi) of which the number corresponds to a plurality of thus given distances, then a priority ki is given per control signal and, as expressed in the following formula (8), those control signals may also be synthesized and supplied to the image outputting machine.

$$\begin{pmatrix} R \\ G \\ B \end{pmatrix} = \sum_{i=0}^{n} ki \cdot \begin{pmatrix} R_i \\ G_i \\ B_i \end{pmatrix} / \sum_{i=0}^{n} ki \quad (8)$$

Accordingly, if the definition of the distance is different even though the purpose is the same, the control signals of which the number corresponds to the number of the distances given above are obtained, then synthesized in the formula (8) and may be outputted.

If the final control signal is given by the formula (8), each priority ki may take an arbitrary value of real number, however, a preferable range is defined by non-negative real numbers.

As discussed above, in accordance with this embodiment, the image reproduction processes can be consecutively switched corresponding to the purpose.

In the embodiment mentioned above, 3-channel density signals of R (red), G (green) and B (blue) are used as the control signals. However, this is not the sole case of the invention and, 4-channel input signals of Y (yellow), M (magenta), C (cyan) and K (black) as in a publishing system including DTP (desk top publishing) or 3-channel input signals of X, Y and Z in the standard color system. Alternatively, the control signals may be multi-channel input signals: in the case of using a large number of inks as in an ink-jet print system. Further, the control signals of the present invention are not limited to the density signals as mentioned above, which may be replaced by voltage applied to an electron gun as in a CRT (cathode ray tube type display device). Thus, the type and number of channels of the control signals are not particularly limitative in the present invention, and the control signals used may be of any type and consist of any number of channels. These can be appropriately determined in accordance with the image output mode in image output machines including various types of printers, printing presses and printing machines (e.g. silver halide photographic type, electrophotographic type, ink jet type, dye sublimation type) for outputting hard copy images such as photographs and printed documents as well as various types of image display apparatuses (e.g. CRT, LCD, plasma display and the like) for outputting soft copy images.

The method and apparatus for outputting the multi-band image according to the present invention have been described so far. The present invention is not, however, limited to the embodiment discussed above but may be, as a matter of course, modified and changed in many ways without departing from the gist of the present invention within the scope of the present invention.

As explained above, according to the present invention, the image reproduction processes can be consecutively switched corresponding to the purpose of the image reproduction, and the image can be outputted in the image reproduction process suited most to the purpose for reproducing the color with a higher priority given to which factor, the coincidence of the visual appearance between the original image and the duplicate image or the stability of the visual appearance.

Specific examples will hereinafter be explained.

EXAMPLE 1

In Example 1, a person was photographed in a studio by a multi-band camera shown in FIG. 2 and disclosed in Miyagawa et al., "Optics", 11(6), pp. 573–578, (1982), and a spectral reflectance per pixel was estimated from the obtained image data of 8 channels by an interpolation technique disclosed in S. K. Park and F. O. Huck Appl. Opt., 16 (1977) 3107.

Next, a printer Pictrography 3000 made by Fuji Photo Film Co., Ltd. created and outputed (9×9×9) pieces of print patches. Then, a color analyzer C2000 made by Hitachi, Ltd. measured a spectral reflectance of each of the print patches.

A look-up table LUT showing relations between the control signals and the spectral reflectances was created by referring simultaneously to the control signal when outputting the print patch and the spectral reflectance of the print patch.

Obtained was the spectral reflectance $f(\lambda)$ minimizing the distance given by the formula (3) with respect to the spectral reflectance per pixel. This spectral reflectance $f(\lambda)$ was converted into one of control signals (first control signals) ($R_0$, $G_0$, $B_0$) by use of the look-up table LUT.

Further, the spectral reflectance $f(\lambda)$ minimizing the distance given by the formula (4) was obtained and similarly converted into one of control signals (second control signals) ($R_1$, $G_1$, $B_1$) by use of the look-up table LUT.

Then, the priority k was set such as $0 \leq k \leq 1$, and the first control signals and the second control signals were synthesized in accordance with the formula (7) shown above, and outputted a synthesized final control signal as output image data.

Herein, supposing that the priority k, if the output image was observable under only a fixed standard light source, was set to 0, the degree of the coincidence of the visual appearance is obtained by the first control signals based on the chromaticity reproduction using the formula (3). If observable under a variety of observation light sources, the stability of the visual appearance was gained by the second control signals based on the waveform reproduction using the formula (4) by setting the priority k to 1. Moreover, if the priority k was set to an intermediate value between 0 and 1, the intermediate color reproduction was attained. For instance, when trying to gain the degree of the coincidence of the visual appearance in addition to the stability of the visual appearance, even if it brought more or less decline to the stability, switching of the reproduction mode such as setting the priority k to, e.g., 0.8 could be easily made.

EXAMPLE 2

Example 2 involved the use of a multi-band camera manufactured to have a following construction.

To be specific, the multi-band camera in Example 2 was constructed of a CCD camera module, a spectral filter module and a personal computer.

The CCD camera for use was CA-D4-1024A, PCI I/F made by DALSA Corp. This CCD camera provided a monochrome image, in which the number of pixels was 1024×1024, and a pixel size was 12×12 ($\mu$).

The spectral filter for use was a liquid crystal tunable filter, i.e., Varispec Tunable Filter RS232C I/F made by CRI Corp. In this tunable filter, a central wavelength could be arbitrarily selected within a wavelength range of 400~720 nm, a wavelength half-value width was 30 nm, and a transmissivity was 6~60% (depending on the wavelength).

Further, the personal computer was a book-type PC (Windows95) C++ made by PROSIDE Corp., wherein a CPU thereof was 166 MHz and a RAM had a capacity of 128 Mbytes.

A Macbeth chart and a face of person were photographed as an object by using the multi-band camera described above under the following photographing conditions.

Figure 5:
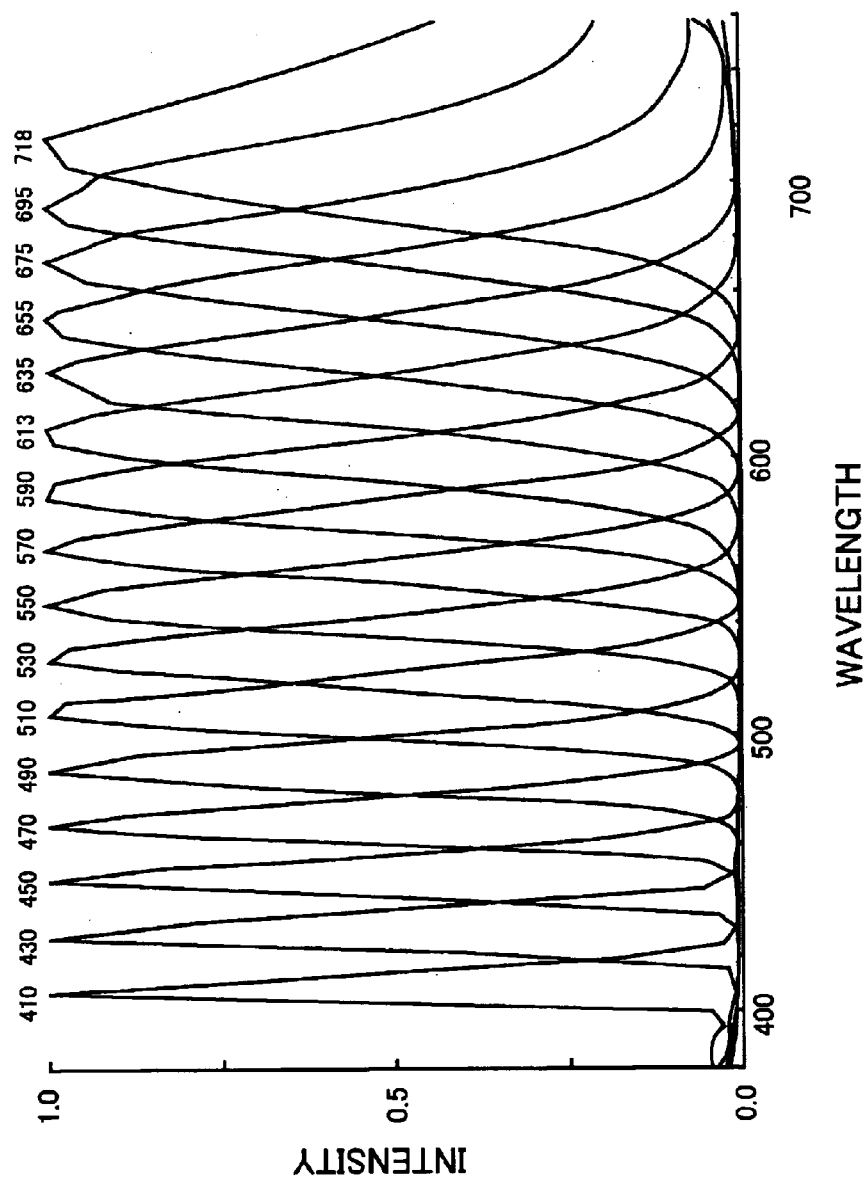
FIG. 5 is a graph showing 16-channels sensitivities when photographed by a multi-band camera in Example 2 of the invention.

The photographing conditions were given below. A metal halide lamp having an object illuminance of 12000 lux was used as a light source. Nikomart (f=50 mm, F1.4) with F2.8 was used as a lens. Further, 16-pieces of spectral images were obtained as (digital) data on 16 wavelengths (channels) as shown in FIG. 5, in which a wavelength band that was under 410 nm but over 730 nm was cut by using an ultraviolet-ray/infrared-ray cut filter, and a wavelength range of 410 nm ~710 nm was divided at an interval of a wavelength 20 nm. Note that a total photographing time was 3 sec of which one-shot exposure time was 25 msec.

Six pattern elements among the 16 wavelength bands of the thus obtained 16 input images were picked up from a gray chart of the Macbeth chart, and digital data values thereof were extracted. A one-dimensional look-up table 1DLUT was created by comparing these digital data values with spectral reflectances of the already-obtained 6 gray elements in the Macbeth chart.

Then, all the digital data values of the input images were converted into spectral reflectances by using 1DLUT per wavelength band. Subsequently, the spectral reflectance per pixel was gained.

The spectral reflectance minimizing the distance given by the formula (3) with respect to the spectral reflectance per pixel was obtained in the same way as in Example 1, and converted into the (first) control signal by use of the look-up table LUT in Example 1.

On the other hand, the spectral reflectance minimizing the distance given by the formula (4) was likewise obtained and converted into the (second) control signal by use of the look-up table LUT.

Then, the priority k was set such as $0 \leq k \leq 1$, and the first control signals and the second control signals were synthesized in accordance with the formula (7), and outputted as output image data.

As discussed above, according to Examples 1 and 2, the image reproduction processes can be consecutively switched in accordance with the purpose of the image reproduction. As a result, the image can be outputted in the image reproduction process suited most to the purpose for reproducing the color with a higher priority given to which factor, the coincidence of the visual appearance between the original image and the duplicate image or the stability of the visual appearance.

What is claimed is:

1. A method for outputting multi-band image data, comprising the steps of:

obtaining a spectral waveform per pixel of an image photographed by a multi-band camera;

performing conversion of the thus obtained spectral waveform per pixel into a control signal corresponding to each of a plurality of image reproduction processes, for outputting to an image outputting machine; and synthesizing a plurality of control signals corresponding to said plurality of image reproduction processes, respectively, to obtain a final control signal.

2. The method according to claim 1, wherein said plurality of image reproduction processes include a chromaticity reproduction and a waveform reproduction of the spectral waveform per pixel.

3. The method according to claim 1, wherein said conversion performing step comprises the steps of:

determining a spectral waveform of a reproduced image of the photographed image from said spectral waveform of the photographed image; and converting the thus determined spectral waveform of the reproduced image to said control signal for outputting to said image outputting machine.

4. The method according to claim 3, wherein said plurality of image reproduction processes include a chromaticity reproduction and a waveform reproduction of the spectral waveform per pixel; and when said spectral waveform of the photographed image is denoted by $f_0(\lambda)$, said spectral waveform of the reproduced image of the photographed image is denoted by $f(\lambda)$ and color matching functions are denoted by $\bar{x}(\lambda)$, $\bar{y}(\lambda)$ and $\bar{z}(\lambda)$;

said chromaticity reproduction comprises the step of determining said spectral waveform $f(\lambda)$ of the reproduced image in such a way that a distance $\|f_0-f\|$ defined by a following formula (3) is minimized; and said waveform reproduction comprises the step of determining said spectral waveform $f(\lambda)$ of the reproduced image in such a way that a distance $\|f_0-f\|$ defined by a following formula (4), (5) or (6) is minimized;

$$\|f_0 - f\| = \{|(f_0, \bar{x})(f, \bar{x})|^2 + |(f_0, \bar{y})(f, \bar{y})|^2 + |(f_0, \bar{z})(f, \bar{z})|^2\}^{1/2} \quad (3)$$

$$\|f_0 - f\| = \sqrt{\int |f_0(\lambda) - f(\lambda)|^2 d\lambda} \quad (4)$$

$$\|f_0 - f\| = \int |f_0(\lambda) - f(\lambda)| d\lambda \quad (5)$$

$$\|f_0 - f\| = sup\{|f_0(\lambda) - f(\lambda)|\} \quad (6)$$

wherein a symbol (A, B) in the above formula (3) represents an inner product of functions $A(\lambda)$, $B(\lambda)$ of wavelength $\lambda$ and is defined by a following formula (2), $$(A, B) = \int A(\lambda)B(\lambda)d(\lambda) \quad (2)$$

a symbol $\int$ in the above formulae (4) and (5) represent integration over all the wavelength $\lambda$ and a symbol sup in the above formula (6) represents an upper limit.

5. The method according to claim 1, further comprising the step of:
setting a priority for said plurality of image reproduction processes; wherein said plurality of control signals are synthesized based on the priority.

6. The method according to claim 5, wherein said priority is set interactively.

7. The method according to claim 1, wherein said conversion is performed with a look-up table showing relations between said control signal for outputting to the image outputting machine and said spectral waveform.

8. The method according to claim 1, wherein said spectral waveform is a spectral reflectance.

9. The method according to claim 1, wherein said control signal is an input signal to said image outputting machine, and a type and a channel number of said input signal are determined in accordance with an image outputting mode of said image outputting machine.

10. The method according to claim 1, wherein said control signal is a density signal.

11. The method according to claim 1, wherein said image outputting machine is a laser printer and said control signal is a density signal of each of three primary colors of red, green and blue.

12. The method according to claim 1, wherein said image outputting machine is a printing press or a printer for a printing and said control signal is a density signal of each of four colors of yellow, magenta, cyan and black.

13. The method according to claim 1, wherein said image outputting machine is a cathode ray tube type display device and said control signal is an applied voltage of an electron gun of the cathode ray tube type display device.

14. An apparatus for outputting multi-band image data, comprising:
a data input unit for inputting multi-band image data obtained from an image photographed by a multi-band camera;
a control signal converting unit for converting a spectral waveform per pixel into a control signal, corresponding to each of a plurality of image reproduction processes, for outputting the image to an image outputting machine; and
a control signal synthesizing unit for obtaining a final control signal by synthesizing a plurality of control signals into which said control signal converting unit has converted spectral waveforms.

15. The apparatus according to claim 14, wherein said plurality of image reproduction processes include a chromaticity reproduction and a waveform reproduction of the spectral waveform per pixel.

16. The apparatus according to claim 14, further including a priority setting unit for setting a priority for said plurality of image reproduction processes; wherein said control signal synthesizing unit synthesizes said plurality of control signals converted by said control signal converting unit based on the priority, thereby obtaining the final control signal.

17. The apparatus according to claim 16, wherein said priority setting unit sets the priority interactively.

18. The apparatus according to claim 14, wherein said control signal converting unit converts said spectral waveform into said control signal with a look-up table showing relations between said control signal for outputting to the image outputting machine and said spectral waveform.

19. The apparatus according to claim 14, wherein said spectral waveform is a spectral reflectance.

20. The apparatus according to claim 14, wherein said control signal is an input signal to said image outputting machine, and a type and a channel number of said input signal are determined in accordance with an image outputting mode of said image outputting machine.

21. The method of claim 1, wherein each of the plurality of control signals comprises a set of signals.

22. The apparatus of claim 14, wherein each of the plurality of control signals comprises a set of signals.

23. The method of claim 1, wherein the image reproduction processes retain information related to the spectral waveform of an illuminating light of the photographed image.

24. The apparatus of claim 14, wherein the image reproduction processes retain information related to the spectral waveform of an illuminating light of the photographed image.

25. A method for transmitting multi-band image data, comprising the steps of:
obtaining a spectral waveform per pixel of an image comprising multi-band data;
performing conversion of the spectral waveform per pixel into a control signal corresponding to each of a plurality of image reproduction processes; and
synthesizing a plurality of control signals corresponding to said plurality of image reproduction processes, respectively, to obtain an output signal for transmitting to an image reproduction machine;
wherein the plurality of image reproduction processes includes a chromaticity reproduction and a waveform reproduction of the spectral waveform per pixel.

26. An apparatus for transmitting multi-band image data, comprising:
a data input unit for collecting multi-band image data obtained from an image comprising multi-band image data;
a control signal converting unit for converting a spectral waveform per pixel into a control signal corresponding to each of a plurality of image reproduction processes; and
a control signal synthesizing unit for obtaining an output signal by synthesizing the plurality of control signals converted by the control signal converting unit and for transmitting the image, to an image reproduction machine;

wherein the plurality of image reproduction processes includes a chromaticity reproduction and a waveform reproduction of the spectral waveform per pixel.

27. The method of claim 1, wherein the final control signal produces a reproduced image whose spectral waveform is substantially the same as the spectral waveform of the photographed image.

28. The method of claim 14, wherein the final control signal produces a reproduced image whose spectral waveform is substantially the same as the spectral waveform of the photographed image.

29. The method of claim 2, wherein the spectral waveform is a spectral reflectance.

30. The method of claim 15, wherein the spectral waveform is a spectral reflectance.

* * * * *